(12) United States Patent
Pinho et al.

(10) Patent No.: US 11,194,725 B2
(45) Date of Patent: Dec. 7, 2021

(54) METHOD AND APPARATUS FOR ADJUSTING CACHE PREFETCH POLICIES BASED ON PREDICTED CACHE POLLUTION FROM DYNAMICALLY EVOLVING WORKLOADS

(71) Applicant: EMC IP HOLDING COMPANY LLC, Hopkinton, MA (US)

(72) Inventors: Rômulo Teixeira de Abreu Pinho, Niterói (BR); Hugo de Oliveira Barbalho, Rio de Janeiro (BR); Vinicius Michel Gottin, Rio de Janeiro (BR); Roberto Nery Stelling Neto, Rio de Janeiro (BR); Alex Laier Bordignon, Rio de Janeiro (BR); Daniel Sadoc Menasché, Rio de Janeiro (BR)

(73) Assignee: Dell Products, L.P., Hopkinton, MA (US)

( * ) Notice: Subject to any disclaimer, the term of this patent is extended or adjusted under 35 U.S.C. 154(b) by 290 days.

(21) Appl. No.: 16/685,222

(22) Filed: Nov. 15, 2019

(65) Prior Publication Data
US 2021/0149805 A1 May 20, 2021

(51) Int. Cl.
*G06F 12/0862* (2016.01)
*G06N 20/10* (2019.01)
*G06N 5/04* (2006.01)

(52) U.S. Cl.
CPC .......... *G06F 12/0862* (2013.01); *G06N 5/04* (2013.01); *G06N 20/10* (2019.01);
(Continued)

(58) Field of Classification Search
CPC ......... G06F 12/0862; G06F 2212/1016; G06F 2212/6012; G06F 2212/6022; G06N 5/04; G06N 20/00; G06N 20/10
(Continued)

(56) References Cited

U.S. PATENT DOCUMENTS

2017/0371790 A1* 12/2017 Dwiel ................. G06F 12/0811
2021/0133134 A1* 5/2021 Pinho .................. G06F 13/3625
2021/0141738 A1* 5/2021 Barbalho ............. G06F 16/2379

OTHER PUBLICATIONS

Binny S. Gill and Dharmendra S. Modha. 2005. SARC: sequential prefetching in adaptive replacement cache. In Proceedings of the annual conference on USENIX Annual Technical Conference (ATEC '05). USENIX Association, USA, 33. (Year: 2005).*
(Continued)

*Primary Examiner* — Reginald G Bragdon
*Assistant Examiner* — Aaron D Ho
(74) *Attorney, Agent, or Firm* — Anderson Gorecki LLP

(57) ABSTRACT

A cache management system includes a sequentiality determination process configured to determine sequentiality profiles of a workload of IO traces as the workload dynamically changes over time. A learning process is trained to learn a correlation between workload sequentiality and cache pollution, and the trained learning process is used to predict cache pollution before the cache starts to experience symptoms of excessive pollution. The predicted pollution value is used by a cache policy adjustment process to change the prefetch policy applied to the cache, to proactively control the manner in which prefetching is used to write data to the cache. Selection of the cache policy is implemented on a per-LUN basis, so that cache performance for each LUN is individually managed by the cache management system.

16 Claims, 12 Drawing Sheets

(52) U.S. Cl.
CPC .............. *G06F 2212/1016* (2013.01); *G06F 2212/6012* (2013.01); *G06F 2212/6022* (2013.01)

(58) Field of Classification Search
USPC ........................................................ 711/118
See application file for complete search history.

(56) References Cited

OTHER PUBLICATIONS

S. Srinath, O. Mutlu, H. Kim and Y. N. Patt, "Feedback Directed Prefetching: Improving the Performance and Bandwidth-Efficiency of Hardware Prefetchers," 2007 IEEE 13th International Symposium on High Performance Computer Architecture, 2007, pp. 63-74, doi: 10.1109/HPCA.2007.346185. (Year: 2007).*

Vivek Seshadri, Samihan Yedkar, Hongyi Xin, Onur Mutlu, Phillip B. Gibbons, Michael A. Kozuch, and Todd C. Mowry. 2015. Mitigating Prefetcher-Caused Pollution Using Informed Caching Policies for Prefetched Blocks. ACM Trans. Archit. Code Optim. 11, 4, Article 51 (Jan. 2015), 22 pages. (Year: 2015).*

X. Zhuang and H. S. Lee, "Reducing Cache Pollution via Dynamic Data Prefetch Filtering," in IEEE Transactions on Computers, vol. 56, No. 1, pp. 18-31, Jan. 2007, doi: 10.1109/TC.2007.250620. (Year: 2007).*

S. Liao, T. Hung, D. Nguyen, C. Chou, C. Tu and H. Zhou, "Machine learning-based prefetch optimization for data center applications," Proceedings of the Conference on High Performance Computing Networking, Storage and Analysis, 2009, pp. 1-10, doi: 10.1145/1654059.1654116. (Year: 2009).*

B. S. Gill and L. A. D. Bathen. AMP: Adaptive Multi-stream Prefetching in a Shared Cache. In Proceedings of the Fifth USENIX Symposium on File and Storage Technologies (FAST '07), pp. 185-198, San Jose, CA, 2007. (Year: 2007).*

Alan Jay Smith. 1978. Sequentiality and prefetching in database systems. ACM Trans. Database Syst. 3, 3 (Sep. 1978), 223-247. DOI:https://doi.org/10.1145/320263.320276 (Year: 1978).*

A. Balasubramanian et al., *Web Search From a Bus*, CHANT's 07, Sep. 14, 2007 (8 pages).

N. Jouppi, *Improving Direct-Mapped Cache Performance by the Addition of a Small Fully-Associative Cache and Prefetch Buffers*, digital Western Research Laboratory (WRL) Technical Note TN-14, Mar. 1990 (46 pages).

R. Patterson et al., *Informed Prefetching and Caching*, Proc. of the 15$^{th}$ ACM Symp. on Operating System Principles, Copper Mountain Resort, CO Dec. 3-6, 1995, pp. 70-95.

\* cited by examiner

FIG. 6

| Trace Data Structure 600 | Page Count Data Structure 610 | | List of Sequences data structure 620 | Sequence Lengths data structure 630 | | Histogram data structure 640 | |
|---|---|---|---|---|---|---|---|
| | Page | Number | | Head | Length | Length | Count |
| 9 | 9 | 1 | 1335: 9 ↔ 13 | 9 | 1 | 1 | 1 |
| 13 | 13 | 2 | 1340: 13 ↔ 15 | 13 | 2 | 2 | 1 |
| ••• | 15 | 2 | | | | | |
| 15 | | | | | | | |

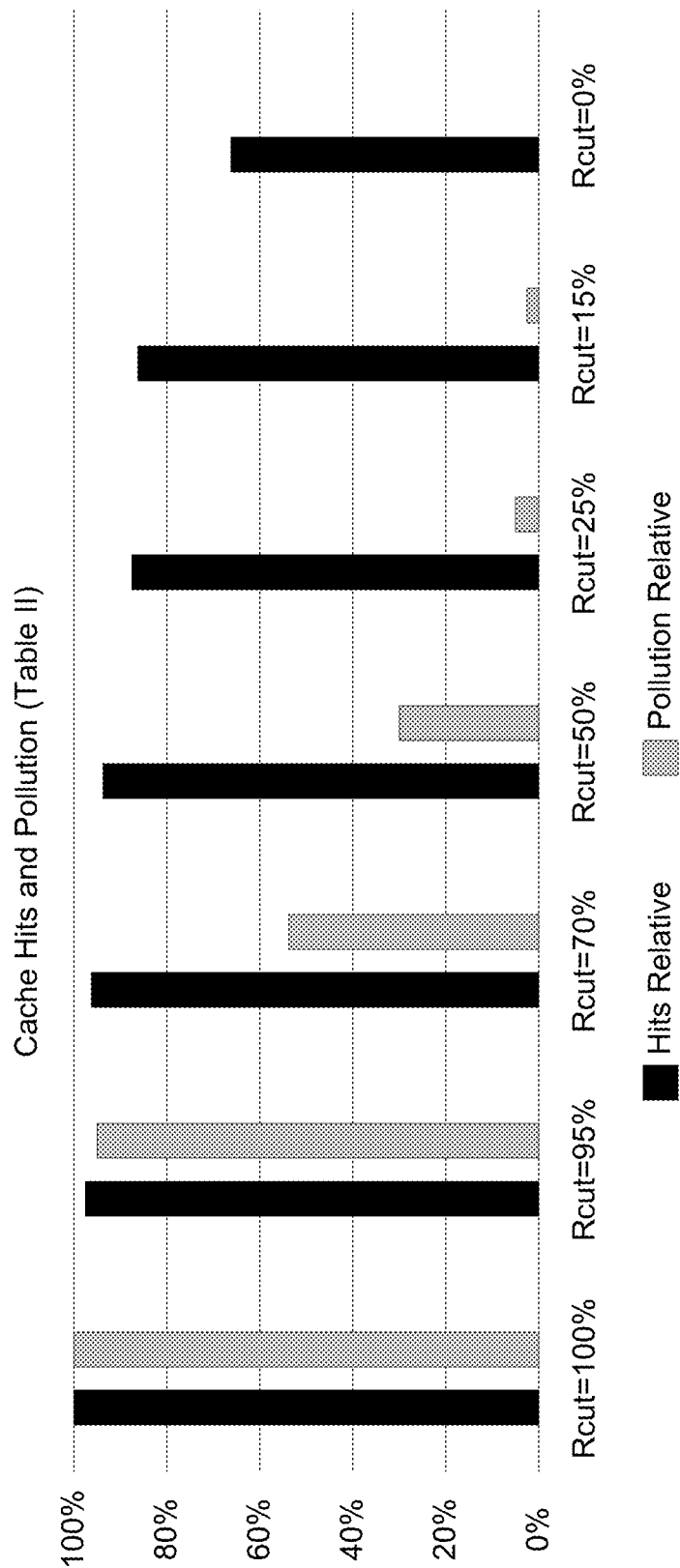

METHOD AND APPARATUS FOR ADJUSTING CACHE PREFETCH POLICIES BASED ON PREDICTED CACHE POLLUTION FROM DYNAMICALLY EVOLVING WORKLOADS

BACKGROUND

This disclosure relates to computing systems and related devices and methods, and, more particularly, to a method and apparatus for adjusting cache prefetch policies based on predicted cache pollution from dynamically evolving workloads.

SUMMARY

The following Summary, and the Abstract set forth at the end of this application, are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a predictive pollution model is trained to correlate workload sequentiality profiles with pollution levels, under a given pre-fetch policy, and the trained pollution model is then used to determine a prediction of a pollution level on the cache given the sequentiality profile of an observed workload. The predicted pollution level is used to proactively adjust a prefetching policy applied to the cache to attempt to minimize pollution without significantly impacting cache hit rate. In some embodiments, a cache management system includes a sequentiality determination process configured to determine sequentiality profiles of a workload of IO traces as the workload dynamically changes over time. A learning process is trained to learn a correlation between workload sequentiality and cache pollution, and the trained learning process is used to predict cache pollution before the cache starts to experience symptoms of excessive pollution. The predicted pollution value is used by a cache policy adjustment process to change the prefetch policy applied to the cache, to proactively control the manner in which prefetching is used to write data to the cache. Selection of the cache policy is implemented on a per-LUN basis, so that cache performance for each LUN is individually managed by the cache management system.

BRIEF DESCRIPTION OF THE DRAWINGS

FIG. 6 is a functional block representation of a set of data structures that can be used to compute a sequentiality profile of a workload represented by the histogram of FIG. 4, according to some embodiments.

FIG. 14 is a bar graph of experimental results showing cache hits and cache pollution levels for several threshold values $R_{cut}$.

DETAILED DESCRIPTION

Figure 1:
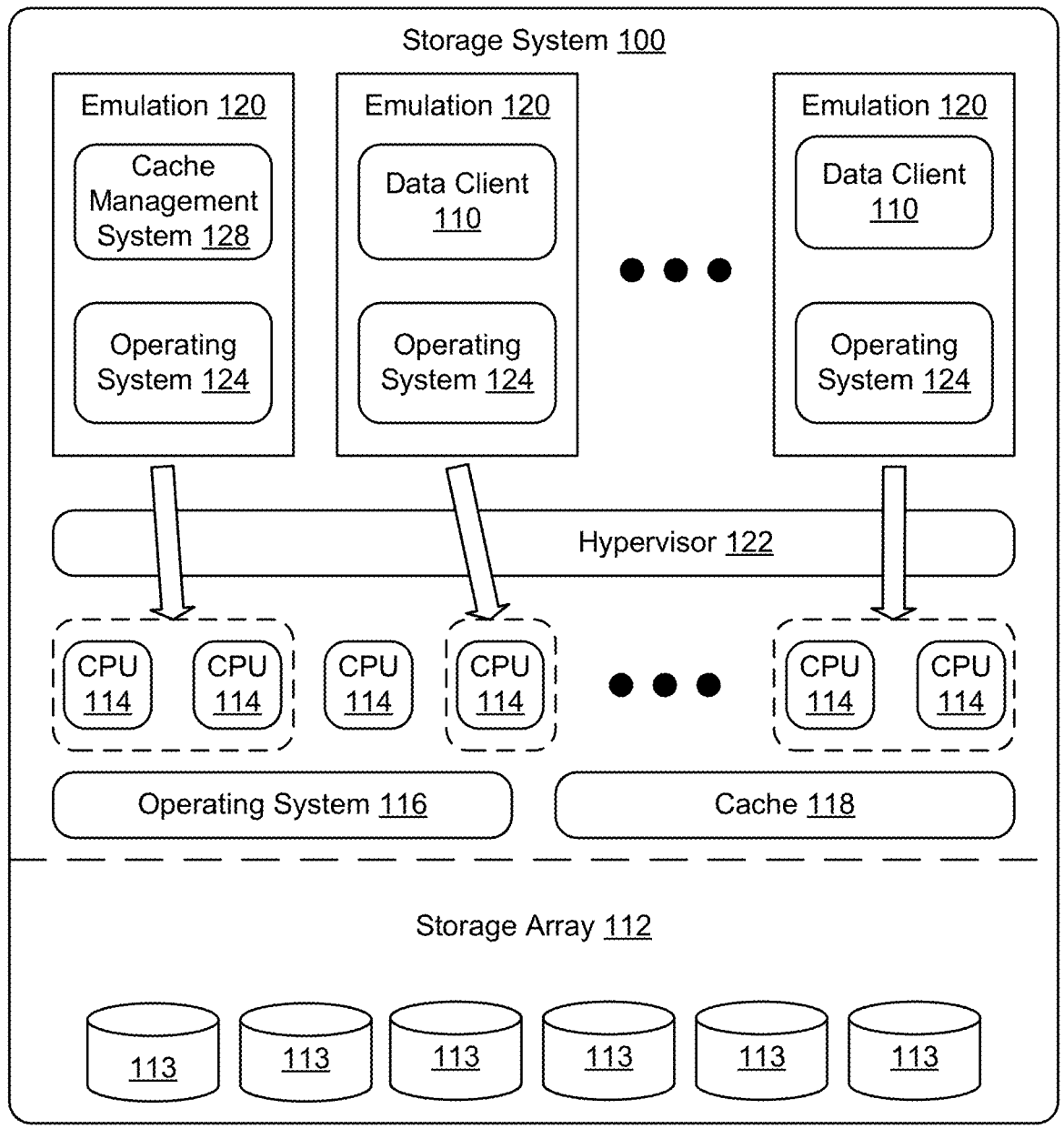
FIG. 1 is a functional block diagram of an example storage system configured according to some embodiments.

FIG. 1 is a functional block diagram of an example storage system 100, in which data clients 110 have access to storage resources provided by a storage array 112. As shown in FIG. 1, in some embodiments the storage system 100 has physical resources including a number of CPU processor cores 114, operating system 116, cache 118, and other physical resources.

Data clients 110 act as hosts and provide access to the storage resources provided by storage array 112. In some embodiments, data clients 110 execute in emulations 120 instantiated in the context of the storage system 100. In some embodiments, a hypervisor 122 abstracts the physical resources of the storage system 100 from emulations 120, and allocates physical resources of storage system 100 for use by the emulations 120. Each emulation 120 has an emulation operating system 122 and one or more application processes running in the context of the emulation operating system 122.

Storage array 112 may be implemented using numerous physical drives 113 using different types of memory technologies. In some embodiments the drives 113 used to implement storage array 112 are implemented using Non-Volatile Memory (NVM) media technologies, such as NAND-based flash, or higher-performing Storage Class Memory (SCM) media technologies, such as 3D XPoint and Resistive RAM (ReRAM). Storage array 112 may be directly connected to the other components of the storage system 100 or may be connected to the other components of the storage system 100, for example, by an InfiniBand (IB) bus or fabric.

Figure 3:
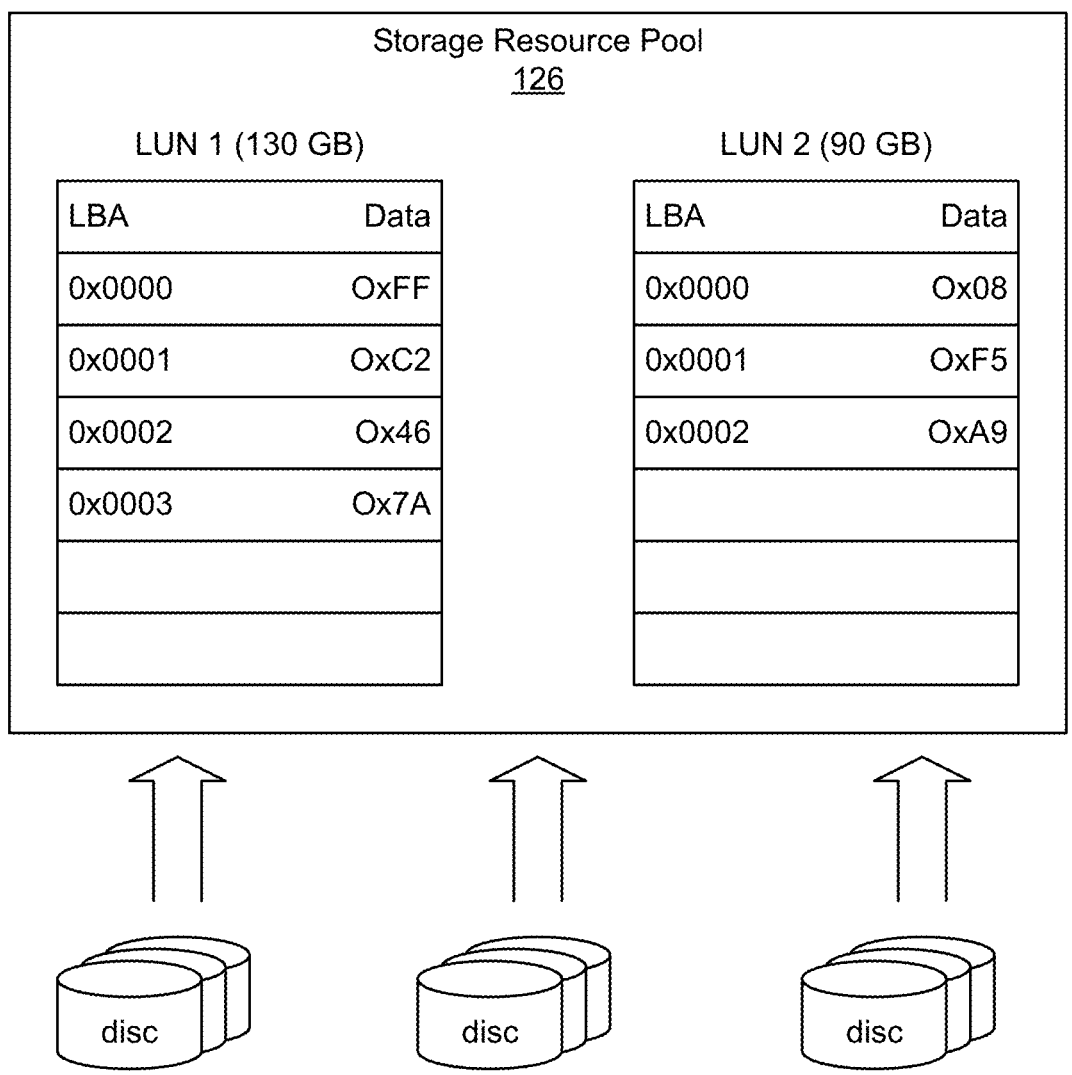
FIG. 3 is a functional block diagram of an example storage system's logical address space, according to some embodiments.

Storage resources of the storage array 112, in some embodiments, are presented as logical units (LUNs) to the data clients 110 (See FIG. 3). Data associated with data client 110 is stored in one or more user filesystems, and each user file system is stored in a separate logical storage volume, referred to herein as a Logical Unit (LUN). A LUN is a logical construct which enables the physical storage resources 113 to be abstracted from the data client 110. The logical storage volume in some instances is referred to as "thin" if actual physical storage resources 113 of storage array 112 are only allocated by the storage system 100 to the LUN when used. Thus, if a LUN is thin, the amount of physical storage resources on discs 113 of storage array 112 that are allocated to the LUN will increase and decrease over time as the file system stored on the LUN increases and decreases in size.

In some embodiments, as shown in FIG. 3, a group of storage resources of the storage array 112 are grouped into a storage resource pool 126. LUNs implemented as separately addressable logical volumes are then created, and associated with the storage resource pool 126. Each LUN has its own separate logical address space that one or more data clients 110 use to perform IO operations on the LUN.

Cache mechanisms are crucial to computer systems such as storage arrays and compute clusters. Correctly placing data with a high probability of being requested on fast memory media can substantially reduce the response times of input/output (I/O) requests.

Resources meant for caching are usually shared among several beneficiaries. Workloads from distinct applications or assigned to different LUNs have different Service Level Agreements (SLAs). Example service levels may include the expected average response time for an IO operation on the LUN, the number of IO operations that may be performed on a given LUN, and other similar parameters.

Figure 2:
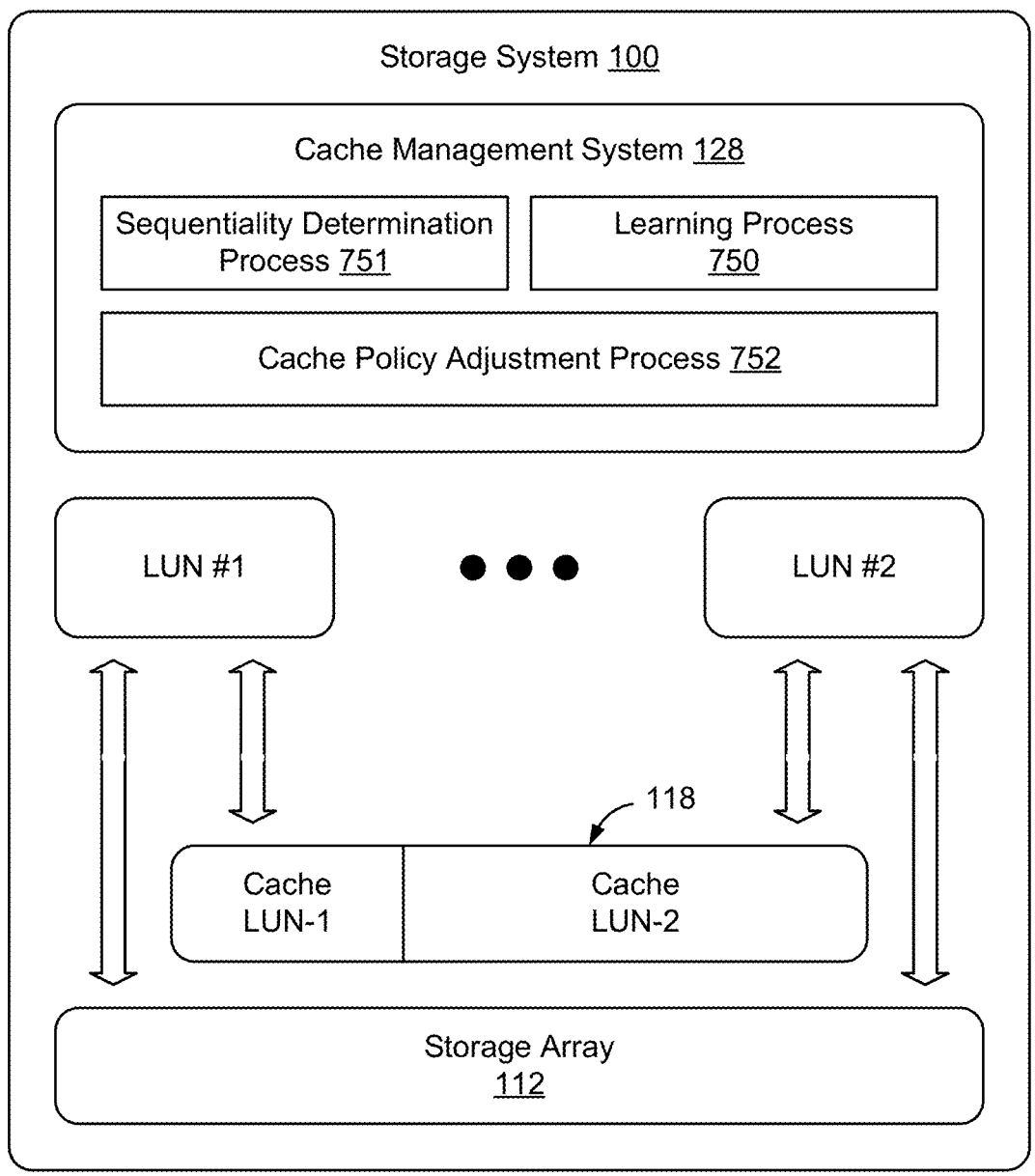
FIG. 2 is a functional block diagram of an example storage system showing the cache management aspects in greater detail, according to some embodiments.

FIG. 2 is a functional block diagram of an example storage system showing aspects of the storage system 100 associated with cache management in greater detail, according to some embodiments. As shown in FIG. 2, in some embodiments portions of the cache are allocated to different LUNs, such that each LUN has a distinct allocation of the cache. According to some embodiments, by adjusting cache policies applied to the cache partitions, the storage system can seek to better meet its SLA obligations for IOs on the LUNs.

Cache performance may be measured by looking at what percentage of reads are able to be serviced from the cache. If an address is requested by an application such as data client 110, and the address is contained in the cache 118, a cache hit occurs and the read request can be serviced from the cache 118. If an address is requested by an application such as data client 110, and the address is not contained in the cache 118, a cache miss occurs and the read request must be serviced from the discs 113 of the storage array 112. The percentage of cache hits is referred to herein as cache hit ratio.

There is no general rule that specifies the size of a cache required to obtain a given cache hit ratio. The intrinsic dynamics of the Least Recently Used (LRU) eviction policy and the stochastic behavior of the workload makes the functioning of the cache difficult to predict.

It is possible to prefetch data into the cache in an attempt to increase the hit rate associated with the cache 118. Prefetching is a well-known technique to optimize cache behavior. It exploits data locality with the assumption that applications often request data residing in sequential addresses in a given address space. Namely, when a device's operating system receives a data access request at a certain address, $A_i$, the system retrieves not only the content of that location, but also the content of the N subsequent address locations, $\{A_{i+1}, \ldots, A_{i+N}\}$, before the application actually requests the data from those other addresses. The operating system then places the retrieved content in the cache 118, which, by design, is a much faster media than the discs 113 of storage array 112 where the data originally resides. If the application (e.g. data client 110) indeed requests data from subsequent addresses, the operating system satisfies those requests directly from the cache 118, instead of fetching data from the slower media at each request.

Unfortunately, cache performance tends to be affected as the workload dynamically changes over time. The frequency of requests, their sizes, and how sequential the reads are can change over time, and these changes can drastically affect how much benefit a particular cache policy will provide. For example, if a workload changes from initially having primarily sequential requests, and then changes to having primarily random requests, using the same cache policy under these different workload characteristics may cause cache performance to vary dramatically.

Storage systems typically have a single prefetching policy, with a cache policy that applies to the entire cache and has a single fixed prefetch look-ahead window. This is not ideal because several applications, with different data access patterns, may access the storage system resources concurrently, and each access pattern traverses the address space of the system distinctly. For instance, some workloads might be sequential, while other workloads might be random; some workloads might traverse the entire address space, while other workloads might be concentrated in a small range of addresses. A given prefetch policy may work quite well with one workload access pattern, while generating excessive pollution when used with another workload access pattern.

One way to determine whether a cache policy is correctly being applied to the cache 118 is to measure cache performance by simply calculating cache hits, misses, and pollution levels. However, such measurements only indicate how the cache is responding to the workload characteristics. Alone, these measurements/indicators cannot explain why a cache policy is not performing well at any given point in time, or predict how changes to the cache policy are likely to affect future cache behavior.

According to some embodiments, a mechanism is described that automatically and dynamically enables and disables a prefetch cache policy on a per LUN basis, depending on the predicted pollution anticipated by application of the cache policy to the cache, given a sequentiality profile of the current workload. In some embodiments, sequentiality profiles of the workloads are leveraged to predict pollution and for decision making. Experimental results demonstrate that dynamically enabling and disabling prefetching can significantly reduce cache pollution and I/O overhead while causing low impact on cache hit rates.

The biggest challenge to decide when and how much data to prefetch is the fact that I/O workloads and data access patterns are dynamic, such that they vary over time. Wrong assumptions about the sequentiality of the data at different points in time may lead to data being prefetched without ever being requested by applications. This problem is referred to herein as cache pollution. In situations where excessive cache pollution occurs, prefetching may cause severe performance degradation. Cache pollution is detrimental to system performance because it needlessly increases data traffic due excessive data fetching, potentially causing bottlenecks in the memory bus. Cache pollution also accelerates the cycling of data in the cache, which can cause the premature eviction of content that could be requested by the applications, potentially leading to more cache misses and more data fetching.

According to some embodiments, a method of automatically switching prefetching on and off is provided, which is based on a prediction of how much pollution will occur in the cache in a subsequent time period based on a current sequentiality profile of the workload on the cache in the current time period. Whenever the predicted pollution is above a certain threshold, prefetching is switched off. Conversely, prefetching is switched back on when the predicted pollution is below the threshold. By doing this, the system is able to achieve high hit ratios by turning on prefetching when the workload exhibits primarily sequential access patterns, and the system is able to reduce pollution by turning off prefetching when the workload exhibits primarily random access patterns. By implementing this policy determination and adjustment process periodically, the cache management system is able to prevent pollution from building up in the cache, and is able to implement cache management on a per-LUN basis.

Turning prefetching on or off does not affect previous workload and only affects cache performance in connection with subsequent requests. Accordingly, to proactively determine whether prefetching should be enabled/disabled, it is necessary to characterize the nature of expected future requests. Thus, predicting disk access patterns is at the core of the prefetching problem. The challenge includes determining when and if an applications' upcoming I/O requests will be in the range of the prefetched requests.

Intrinsically, prefetching is beneficial over sequential access patterns. Indeed, many applications and file types can be associated with sequentiality of access. For instance, image, audio and video processing applications generally process file content sequentially. However, from the perspective of the storage system 100, files are just collections of bytes, and applications are only seen through the lens of the I/O requests they issue to the storage system 100. The cache management system 128 does not have visibility to the type of application that is issuing the IO requests or to the type of data that is being accessed via the IO request. As a result, the challenge for the cache management system 128 is to try to predict future access patterns and prefetching performance, without any knowledge about the nature of the applications and file types.

The pollution levels caused by different prefetching policies can vary greatly under the same I/O workload. For example, one prefetching policy may be to pre-fetch four blocks of data each time an IO request is received, whereas another prefetching policy may be to pre-fetch eight blocks of data each time an IO request is received. Yet another example policy may be to pre-fetch eight blocks of data when two subsequent IO requests are received. Thus, it is necessary to consider the problems described above in a policy-aware manner.

Any predictive mechanism is subject to prediction errors. While errors might be tolerable to a certain extent in some instances, erroneously switching a prefetching policy on and off may lead to unacceptable costs in terms of resource management. Therefore, the dynamic approach relying on prediction must also be robust with regards to errors in the estimation or prediction of the pollution levels in future data access. As shown in FIG. 2, in some embodiments, storage system 100 includes a cache management system 128 configured to monitor use of cache 118 and adjust cache policies to optimize performance of the cache 118. In some embodiments, the cache management system 128 is implemented using one or more of the emulations 122 instantiated on storage system 100 (see FIG. 1). In some embodiments, as discussed in greater detail below, the cache management system 128 includes a sequentiality determination process 751 configured to determine sequentiality profiles of a workload of IO traces as the workload dynamically changes over time. The cache management system 128 also includes a learning process 750 trained to recognize a correlation between workload sequentiality and cache pollution, and use the correlation to predict cache pollution before the cache starts to experience symptoms of excessive pollution.

The predictive pollution value provided by the learning process, in some embodiments, is used by a cache policy adjustment process 752 to change the prefetch policy applied to the cache to proactively control the manner in which prefetching is used to write data to the cache in dependence on the dynamically changing workload. The cache management system 128, in some embodiments, implements the method of predicting cache performance for each LUN to individually manage whether prefetching is turned on or turned off for each LUN based on the current sequentiality profile of the workload associated with that LUN.

According to some embodiments, a predictive pollution model is trained to correlate workload sequentiality profiles with pollution levels, under a given pre-fetch policy, and the trained pollution model is then used to determine a prediction of a pollution level on the cache given the sequentiality profile of an observed workload. The predicted pollution level is used to proactively adjust a prefetching policy applied to the cache to attempt to minimize pollution without significantly impacting cache hit rate.

Although some embodiments will be described in which the learning process is trained to learn a correlation between the sequentiality of workloads and cache pollution levels, it should be noted that other mechanisms for predicting the cache pollution caused by a prefetching policy could be used instead, and the invention is not limited to an implementation that relies on predicting the sequentiality of subsequent workloads to dynamically adjust the prefetching policy applied to the cache.

Sequentiality

Determining sequentiality relies on the existence of I/O telemetry data that indicates how applications traverse the address space of a storage system 100. As shown in FIG. 3, storage offered by the storage array may be divided into many logical units (LUNs), each with its own addressable space defined in logical blocks addresses (LBAs). Enterprise-grade applications are configured in such way to leverage the most out of the underlying storage configuration, and sometimes even determine how the storage should be configured. Since each LUN has its own logical address space, in some embodiments the manner of characterizing the sequentiality is implemented separately for each LUN. The LUN may be allocated a separate portion of the cache 118 or may share the entirety of the cache with other LUNs. Regardless of how the cache 118 is implemented, however, the process of characterizing the sequentiality is implemented on a per-LUN basis.

In some embodiments, the cache management system 128 does not know the type of application that generated the I/O, but rather only has access to storage telemetry data in the form of I/O traces. An IO trace, as that term is used herein, is a collection of pieces of information associated with an IO operation that indicates what type of I/O operation the application issued (e.g., 'read' or 'write'), the size of the operation, a timestamp associated with the operation, and in indication of an address in the LUN's addressable space. An example of such storage telemetry data is shown below in Table I. In Table I:

fileid: An identification of the storage system
timestamp: The date and time of the request
op: The type of operation (read, write, control, etc.)
cpu: The host controller in the system that handled the request
tdev: An identification of a logical unit (LUN) of a system lba: The logical block address accessed by the request in the given LUN
size: The size of the operation in number of blocks

TABLE I

| I/O | ID | FileID (who) | Time-stamp (when) | Op (what) | CPU | tdev lba (where) | Size (how much) |
|---|---|---|---|---|---|---|---|
| 0 | 606 | 0 | 33028 | Write | 61 | 166 4246591162 | 1 |
| 1 | 702 | 0 | 37843 | Write | 77 | 166 4246591163 | 1 |
| 2 | 1494 | 0 | 96355 | Write | 45 | 166 4246591164 | 1 |
| 3 | 1857 | 0 | 119314 | Write | 61 | 166 2015795053 | 1 |
| 4 | 1909 | 0 | 122740 | Write | 29 | 166 2015795054 | 1 |
| 5 | 1926 | 0 | 124447 | Write | 45 | 166 2015795055 | 1 |

The example storage telemetry data, in the form of IO traces shown in Table I, is able to be collected in a storage system 100 and, as discussed in greater detail herein, can be exploited by sequentiality determination process 751 to determine how I/O workloads and access patterns vary with time.

In the following discussion, the logical addressable space, such as the logical address space of the LUNs shown in FIG. 3, is considered to be segmented into blocks of contiguous Logical Block Addresses (LBAs), referred to herein as "pages". For example, a storage system 100 may use pages of 256 LBAs, which is equivalent to 128 kilobytes. For convenience, this disclosure will use the term "address" and "page" interchangeably to refer to the logical block of data retrieved by a storage system 100 in response to a read request. Different storage systems 100 may retrieve different size blocks of data, depending on the implementation.

One of the core challenges in the analysis of and reasoning based on I/O traces is the large number of requests processed in small periods of time. Processing large amounts of requests in efficient manners is required for any kind of online decision making. According to some embodiments, sequentiality is determined using a set of data structures described below in connection with FIGS. 4-6.

In some embodiments, the sequentiality determination process 751 implements computes a histogram of sequence lengths every time an IO occurs on a given LUN. In some embodiments, the sequentiality determination process 751 uses the set of data structure shown in FIG. 6 to implement this process in a computationally efficient manner.

Figure 4:
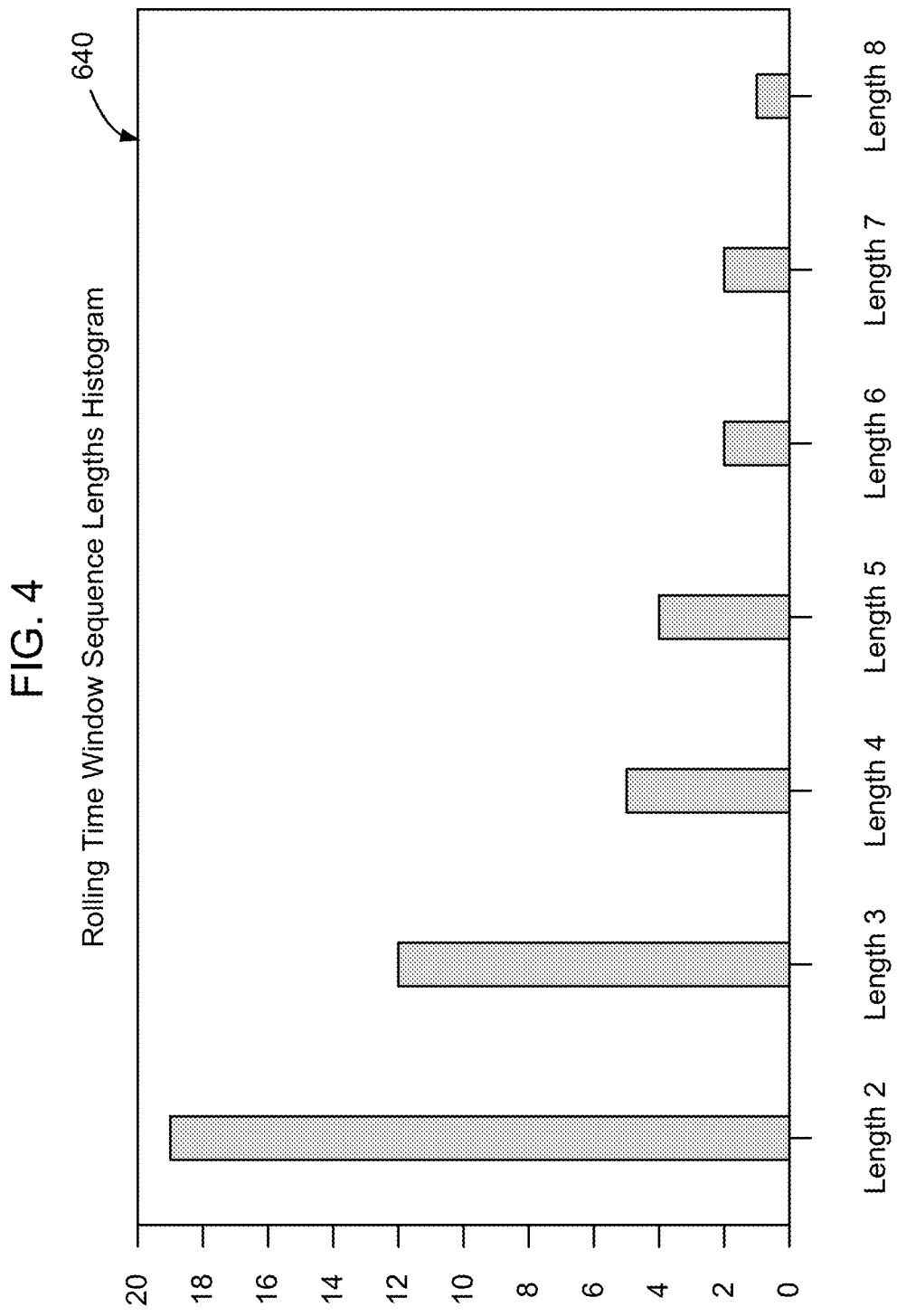
FIG. 4 is a histogram of lengths of sequences observed in an example workload of IO traces during a time window.

According to some embodiments, the sequentiality determination process 751 first finds sequences in the telemetry data comprising collections of address related to subsequent I/O requests that were sent to the same LUN. Next, those patterns are used to compute a sequentiality histogram for the LUN, specifying how many sequences of each length occurred in the set of traces being considered. An example histogram is shown in FIG. 4. The sequence lengths of the histogram characterize the sequentiality profile of the workload on the set of traces being considered.

Figure 5B:
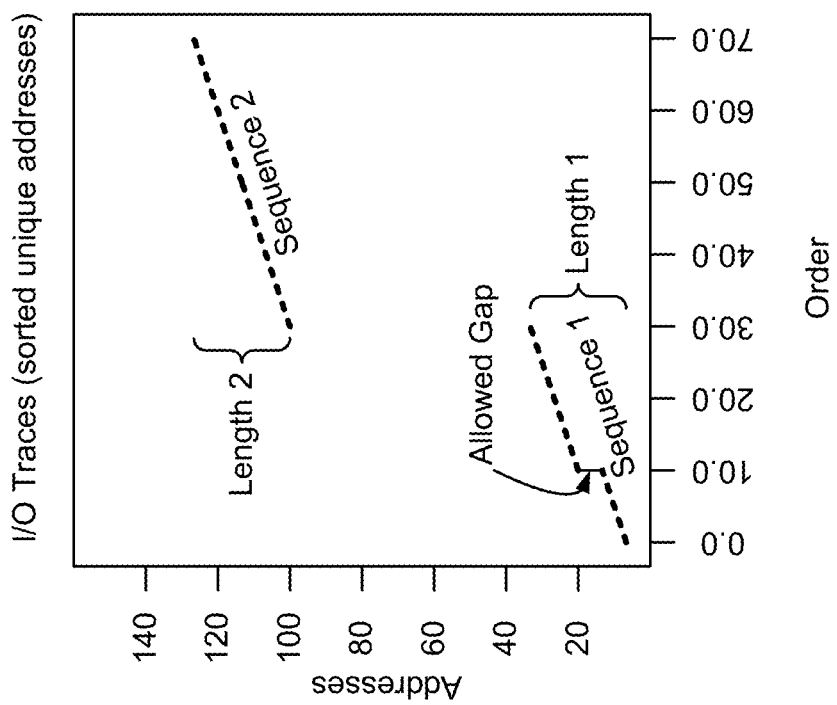
FIG. 5B is a graph showing the example set of cache requests of FIG. 5A sorted by address and discarding repeated access to the same address.
Figure 5A:
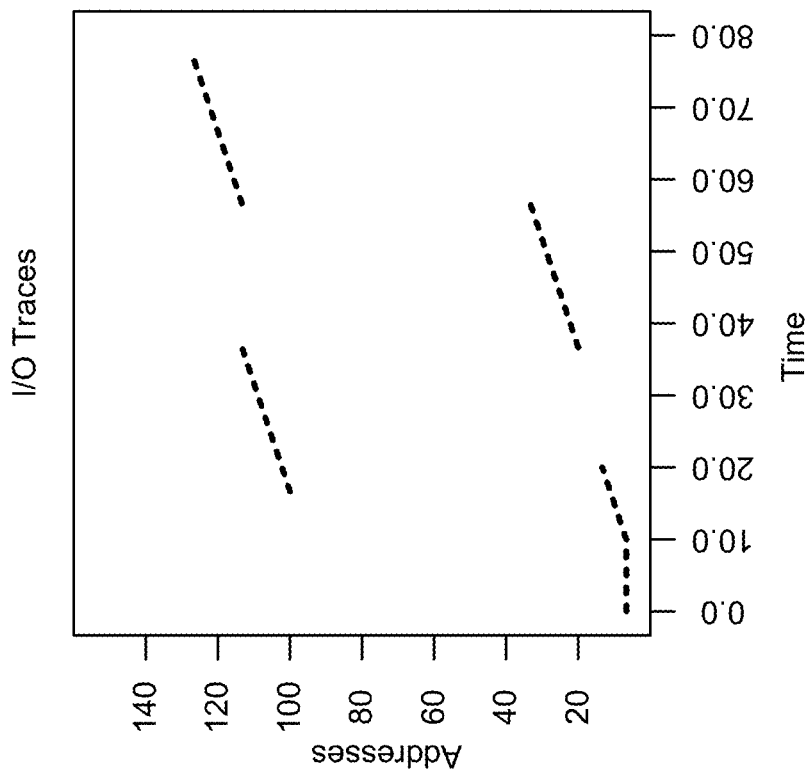
FIG. 5A is a graph showing an example set of cache requests over time.

FIG. 5A is a graph showing an example set of cache requests over time. As shown in FIG. 5A, a given workload (set of IO traces) may be generated by several parallel processes accessing the storage across different address ranges at the same time. As a result, the recorded telemetry data, once serialized, can contain gaps in address ranges. This is shown in FIG. 5A, where two IOs in the address range of between 0 and 40 are separated by an IO in the 10-20 address range.

FIG. 6 shows a set of data structures that can be efficiently used to compute a sequentiality profile each time a new IO occurs on a LUN. In some embodiments, as shown in FIG. 6, a trace data structure 600 contains the set of traces in the window W of traces being considered. A separate IO trace data structure is used for each LUN of the system because each LUN has its own logical address space. Each time a new trace arrives, the page accessed by the trace is added to the trace data structure 600 and one page is evicted from the trace data structure. A page count data structure 610 is used to count the number of instances that a page appears within the page count data structure.

The objective of creating a sequentiality profile of the workload is to collect the lengths of the sequences formed in this sorted segment of addresses. FIG. 5B is a graph showing the example set of cache requests of FIG. 5A sorted by address and discarding repeated access to the same address. Specifically, as shown in FIG. 5B, in some embodiments, to make the process of determining sequentiality easier, the traces in the IO trace data structure are sorted by address, and duplicate requests to the same address are discarded.

From the ordered sequence of traces, a list of sequences data structure 620 is created. The list of sequences data structure 620, in some embodiments, is implemented as a double linked list. Each sequence is an element of the list of sequences data structure 620, and each element points to the previous sequence and subsequent sequence.

In some embodiments, a sequence lengths data structure 630 is used to summarize the lengths of the sequences contained in the list of sequences data structure 620, and a histogram data structure 640 correlating sequence lengths with the number of sequences of each length is created from the sequence lengths data structure 630. FIG. 4 shows an example histogram that may be created using the set of data structures shown in FIG. 6.

Prefetch Pollution

In some embodiments, a method is defined to reduce the cache pollution of systems that make use of pre-fetching. As used herein, prefetch pollution (P) is defined as the number of pages that were prefetched into the cache 118 and were never used. The pollution ratio (Rp), corresponding to a given window of requests, is defined as:

$$Rp = 100 \times P/Q_p$$

where $Q_p$ is the total number of prefetched pages in the period under consideration.

Thus, $R_p$ values range between 0 and 100, representing the percentage of prefetched pages that are never used before being evicted from the cache. An $R_p$ value of 0% corresponds to all prefetched pages being used (perfect prefetching), an $R_p$ value of 100% corresponds to no pre-fetched pages ever being used. Ideally, it is preferable to enable prefetching only when beneficial, and to disable it otherwise.

In some embodiments, the computed sequentiality profiles described above are used to predict a pollution ratio, which is used to turn on/off prefetching. This embodiment corresponds to the implementation that was used in the experimental validation discussed below in connection with FIGS. 12-14.

Figure 7:
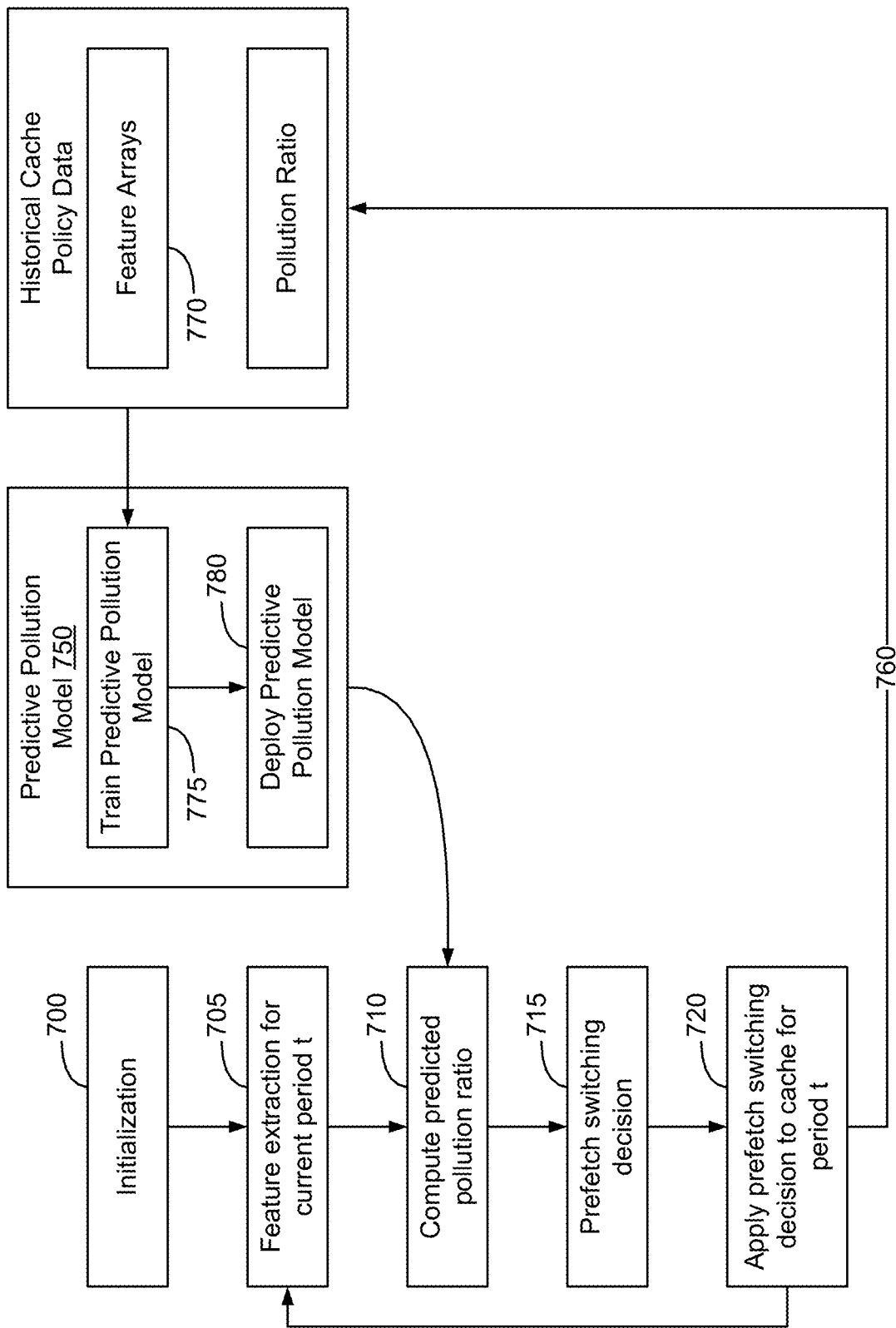
FIGS. 7-9 are flow charts of example methods of adjusting cache prefetch policies based on predicted cache pollution from dynamically evolving workloads, according to some embodiments.

FIG. 7 is a flow chart of an example method of adjusting cache prefetch policies based on predicted cache pollution from dynamically evolving workloads, according to some embodiments.

As shown in FIG. 7, the method starts with an initialization step (block 700) that may include obtaining data related to I/O access patterns (traces) and preprocessing steps on the obtained data to compose necessary data structures (See e.g. FIG. 6, 600, 610, 620, 630, 640).

Features are then extracted from the data over a predetermined period, t (FIG. 7 block 705). In some embodiments, the features extracted from the data is the sequentiality characteristic of the workflow over the time period. The sequentiality profile is used as input to a trained predictive pollution model 780 which is used to predict the pollution level of the cache over the following period of time (FIG. 7 block 710). The predicted pollution level is then used to implement a prefetch switching decision (FIG. 7 block 715) which is used to govern operation of the cache for a subsequent period of time (FIG. 7 block 720).

Figure 8:
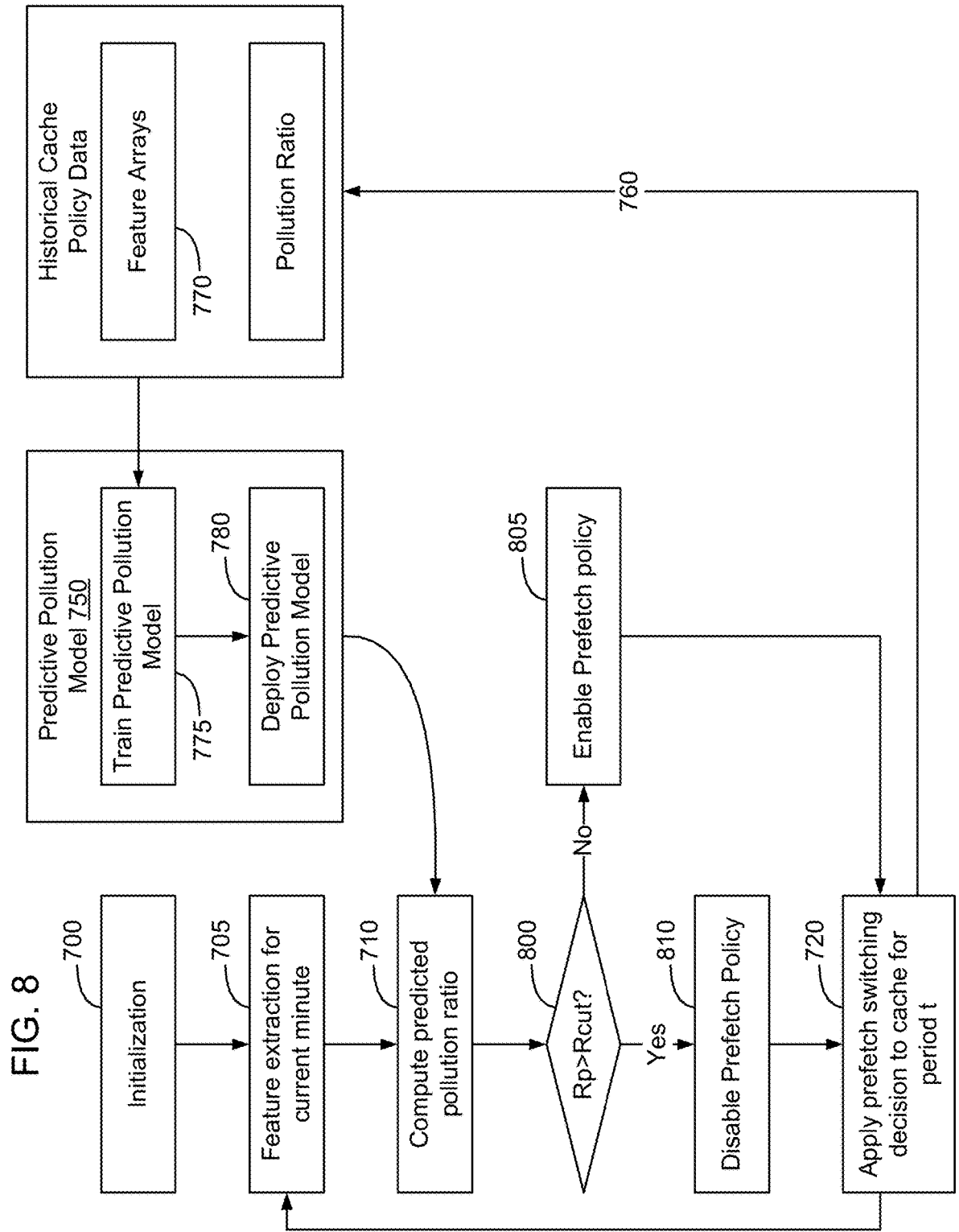

The features (e.g. sequentiality) extracted from the trace data of the workload are provided as input to a predictive pollution model 750, yielding a predicted pollution ratio $\widehat{R_p}$. The method then proceeds to determine, based on the predicted pollution ratio $\widehat{R_p}$, whether prefetching should be turned on or off (FIG. 7 block 715). In some embodiments, as shown in FIG. 8, the pre-fetch switching decision is implemented by comparing (FIG. 8 block 800) the pollution ratio estimate $\widehat{R_p}$ with a determined threshold pollution ratio $R_{cut}$. If the pollution ratio estimate $\widehat{R_p}$ is below the determined threshold pollution ratio $R_{cut}$ (a determination of NO at block 800), pollution is predicted to be relatively low for the upcoming time period if prefetching is enabled and, accordingly, the cache policy adjustment process 752 turns prefetching ON for that LUN for the following period t (FIG. 8 block 805). If the pollution ratio estimate $\widehat{R_p}$ is above or equal to the determined threshold pollution ratio $R_{cut}$ (a determination of YES at block 800), pollution is predicted to be relatively high for the upcoming time period if prefetching is enabled and, accordingly, the cache policy adjustment process 752 turns prefetching OFF for that LUN for the following period t (FIG. 8 block 810).

The selected prefetch policy is then applied to the cache 118 by the cache policy adjustment process 752 of cache management system 128 for a predetermined period t (FIG. 7 block 720). In some embodiments, the predetermined period t is a period of one minute. After the predetermined period t, or during the predetermined period t, the feature of interest such as the cache hit ratio, sequentiality profiles of the trace data, or other features are collected (block 705). The operational parameters of interest of the cache are iteratively used in the process to determine what cache policy should be applied to the cache 118 for the next upcoming period t (FIG. 7 blocks 705, 710, 715). In some embodiments, the on/off decision (FIG. 7 block 714, FIG. 8, block 800) lasts for another period t, during which time more trace data of the workload is collected. After the period t, the prediction/decision flow is repeated. In some embodiments, the period t is fixed, whereas in other embodiments the process utilizes an adaptive time window or performs the cache evaluation process described herein based on how many traces have been received on the cache, i.e. performs the process every 1000 traces or every 10000 traces.

In some embodiments, the period t is defined to be one minute. This is based on empirical observations which indicated that this is a long-enough period to characterize a state of the workload and benefit from cache configuration updates, including those related to model retraining and deployment. Other time periods t may likewise be used, and the invention is not limited to an implementation in which the cache management system 128 adjusts the cache prefetch policies on a per LUN basis once each minute.

In some embodiments, a predictive pollution model 750 is trained with historical trace data. The task of the training step (FIG. 7 block 775) is to enable the predictive pollution model to learn a correlation between workload sequentiality characteristics (FIG. 10, 1005) and measured pollution levels (FIG. 10, 1010) for a given cache prefetch policy. Such model 750 can be retrained from time to time, for example incrementally as new trace data is obtained, as shown in FIG. 7 by arrow 760.

Figure 11:
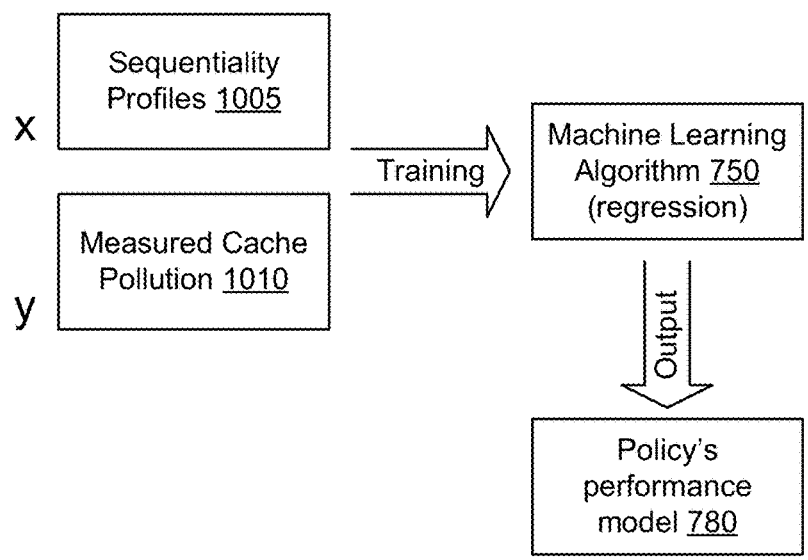
FIG. 11 is a functional block diagram of an example training process of a machine learning algorithm.

In some embodiments, the predictive pollution model 750 is a learning process implemented using a regression model. Regression analysis is a form of predictive modelling technique which investigates the relationship between a dependent variable y (target) and independent variable x (predictor). As shown in FIG. 11, in some embodiments the independent variable x in the regression model used to implement the predictive pollution mod& 750 is the sequentiality profile 1005, and the dependent variable y is the level of cache pollution 1010.

There are several types of regression analysis that can be used for forecasting, time series modelling, and finding the causal effect relationship between the variables. In some embodiments, the predictive pollution model is implemented using a regression model trained to predict the future pollution ratios incurred by a prefetching policy under a certain workload profile. In some embodiments, the regression model is a support vector regression (SVR) learning process. In some embodiments, the regression model is a regression tree learning process. Other regression models may be used as well depending on the implementation.

SVR typically produces results more accurate than regression trees, at the expense of being more computationally costly and less interpretable. The regression tree, on the other hand, is interpretable, which is beneficial in that it is possible to determine why prefetching was enabled or disabled at a given time window. Specifically, with a regression tree model, given a sequentiality profile set as input to a decision tree, it is possible to determine which features are used to predict the value of the metric of interest, e.g., pollution.

Random I/O patterns diminish the benefits of prefetching and may incur high levels of pollution. In those cases, the method should correctly predict an increased level of pollution and pro-actively disable prefetching to prevent performance degradation. Conversely, in sequential I/O patterns, the method should predict a reduction in pollution levels (assuming the prefetching policy correctly exploits the sequential pattern) and switch the prefetching policy back on again.

In some embodiments, the predictive pollution model 750 is trained with sequentiality profiles, such as the histograms described above and shown in FIG. 4, as input, historical data about the pollution levels experienced by the cache 118 under workloads described by the sequentiality profiles, and the cache policies that were in place which caused the pollution level during the period of time when the workload was characterized by the sequentially profile (for example whether prefetching was turned on or off at the time). In some embodiments, the sequentiality profiles, cache pollution data, and cache policy correlation information is contained as feature array 770 (See FIG. 10) of historical cache policy data. The predictive pollution model 750 is trained to learn a correlation between sequentiality and cache pollution levels, for a given cache prefetch policy.

Once the predictive pollution model 750 is trained, it is deployed (FIG. 7 block 780) and the predictive pollution model 750 is used to compute a predicted pollution ratio (FIG. 7 block 710) based on the sequentiality profile of the processing period t, for example over the last minute.

Thus, in some embodiments, the predictive pollution model 750 learns a relationship between workload sequentiality and cache pollution, and uses that learned relationship to identify and predict the levels of cache pollution expected to be generated by a workload with a certain sequentiality profile and under a certain prefetching policy. Then, that prediction is then used by the cache policy adjustment process 752 of the cache management system 128 to turn prefetching ON or OFF for the subsequent processing period t. If, based on the currently observed sequentiality profile, the predictive pollution model 750 predicts that pollution for the subsequent period is expected to be above a certain threshold, cache prefetching is switched off. Otherwise, it remains active. As discussed below, the threshold may be determined in multiple ways, but in some embodiments is determined in part by the available throughput in the memory bus and by the cache size.

Figure 10:
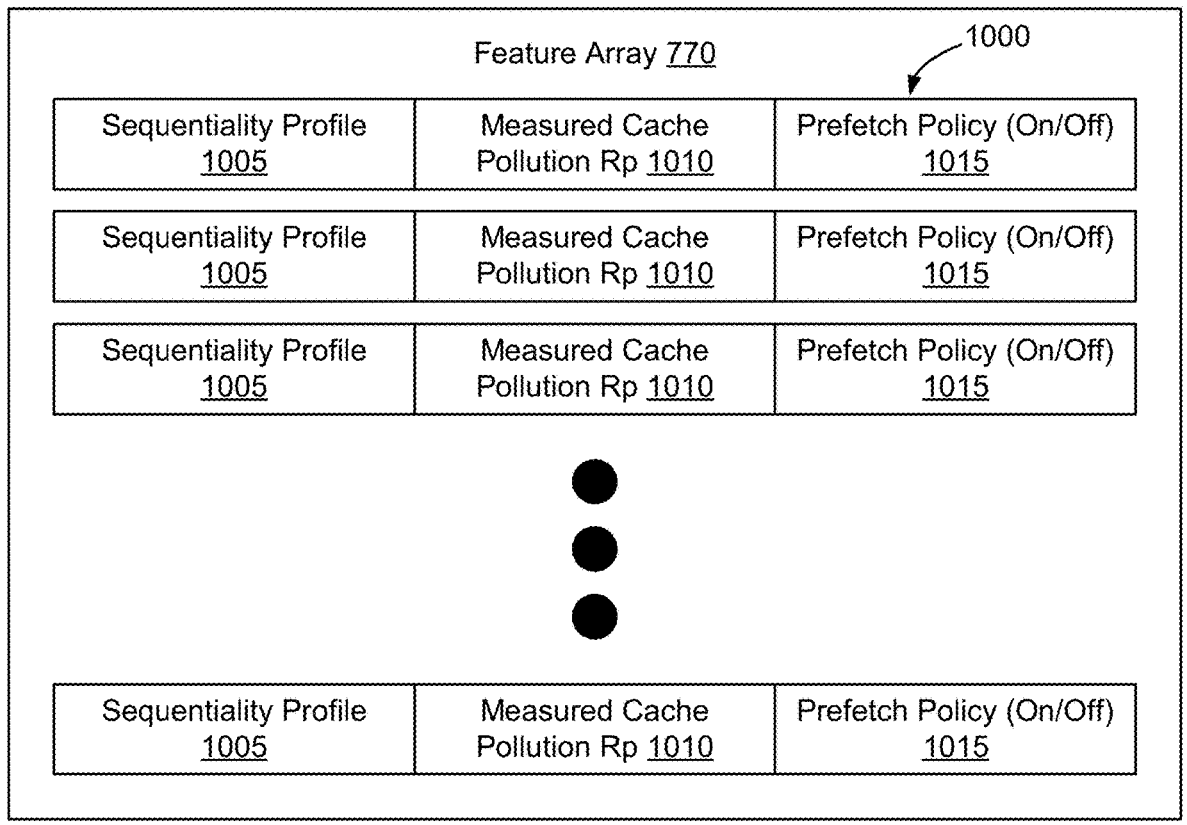
FIG. 10 is a functional block diagram of an example feature array according to some embodiments.

In some embodiments, the predictive pollution model 750 is trained to predict $\widehat{R_p}$ using feature array 770 containing training data. FIG. 10 shows an example feature array according to some embodiments of the invention. As shown in FIG. 10, the feature array has a set of training data, in which each entry 1000 includes the sequentiality profile 1005 of the IO workload during a time interval, a measured cache pollution ratio Rp 1010 experienced by the cache during that time interval, and the cache prefetching policy 1015 that was in place during the time interval (e.g. whether prefetching was turned on/off).

In some embodiments, the sequentiality profile 1005 is computed, as described above, as a histogram computed from dynamically changing workload of I/O requests on the storage system. The measured cache pollution levels 1010 that occurred in the cache 118 during the period of time associated with the sequentiality profile is obtained by observing the actual operation characteristics of the cache 118 while processing the IO requests. The cache prefetch policy 1015, in some embodiments, is a binary value indicating whether the cache prefetch policy was turned ON during the time interval or whether the cache prefetch policy was turned OFF during the interval.

The entries of training data contained in feature array 770 may be based on actual historical data experienced by a storage system, collected over time intervals, or may be based on simulations of cache behavior from previously collected trace data. In some embodiments, each time interval such as each minute or some other interval of different length, the system computes the sequentiality profile 1005 for the workload of IO traces and collects metadata including the prefetch policy and measured pollution ratio Rp 1010. In some embodiments, a significant amount of training data is collected, such as by collecting training data on a storage system over a period of days or weeks, to enable the feature array 770 to have a significant number of entries 1000.

Figure 9:
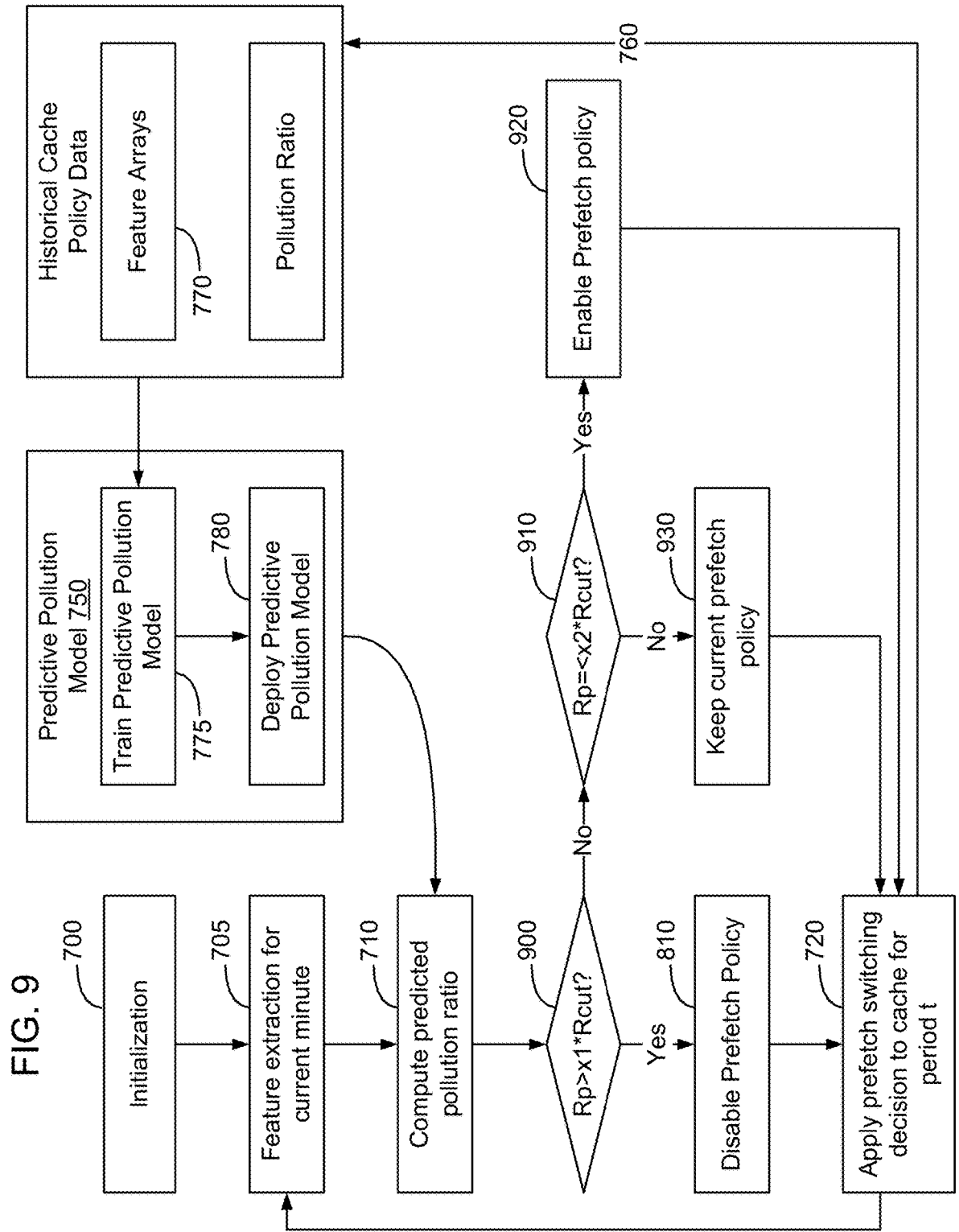

In an environment where data remains in the cache for a period (eviction period) that significantly exceeds the time period used by the predictive process shown in FIGS. 7-9, using a learning process to predict whether traffic is likely to significantly affect cache pollution is advantageous, because it can prevent cache pollution before the cache performance is degraded. Specifically, by proactively turning prefetching on/off based on the current sequentiality profile of the IO traces, the cache management system 128 can prevent cache pollution from occurring when the workload becomes more random, and can turn prefetching back on when the workload becomes more sequential. This enables the cache management system 128 to proactively prevent pollution in the cache to prevent degradation of cache performance. By contrast, a system that only turns on/off prefetching based on cache performance, does so reactively and by the time the degradation of cache performance is detected, it is too late. Specifically, in an environment where the cache eviction period significantly exceeds the time period used by the predictive process described herein, waiting for the cache performance to degrade can cause a large amount of data to be fetched to the cache that will never be used. This useless data (pollution) will take a significant amount of time to be evicted from the cache and, accordingly, the cache will exhibit the reduced performance during this period while the pollution slowly is evicted from the cache. By proactively predicting whether pollution is likely to occur given the current characteristics of the dynamically evolving workload, it is possible to minimize pollution proactively to prevent performance of the cache from occurring without waiting for the cache to show signs of degradation.

Once a set of training data has been collected, the training data is applied to train the predictive pollution model 750 (FIG. 7 block 775) to create a pattern matrix correlating sequentiality profiles with pollution ratios, based on prefetching policies.

FIG. 11 shows an example training process. As shown in FIG. 11, in some embodiments, training the predictive pollution model 750 results in creating a pattern matrix correlating cache pollution values 1010 with sequentiality profiles 1005. The independent variable x in the model, therefore, is the vector defining the sequentiality profile 1005, and the dependent variable y is the pollution ratio of the cache $R_p$. As noted above, the goal is to train the predictive pollution model 750 such that, given a current sequentiality profile of the current workload in a previous time interval, the predictive pollution model 750 is able to use the current sequentiality profile to predict the pollution level of the cache during the next time interval (e.g. for the next minute). Since this is done on an on-going basis, it is possible to continuously adjust cache prefetch policies based on predictive cache pollution from dynamically evolving workloads.

In some embodiments, to evaluate the quality of the trained model, the training data is split such that some of the data of the feature array 770 is used to train the predictive pollution model 750, and the other portion of the data of the feature array 770 is used to test the predictive pollution model 750. For example, 60% of the data of the feature array 770 might be used to train the model and the other 40% of the data of the feature array 770 might be used to test the accuracy of the trained predictive pollution model 750. Experimentally, it was determined that the two regression algorithms, SVR and regression tree, empirically performed equally well, considering the $R^2$ quality measure.

Figure 12:
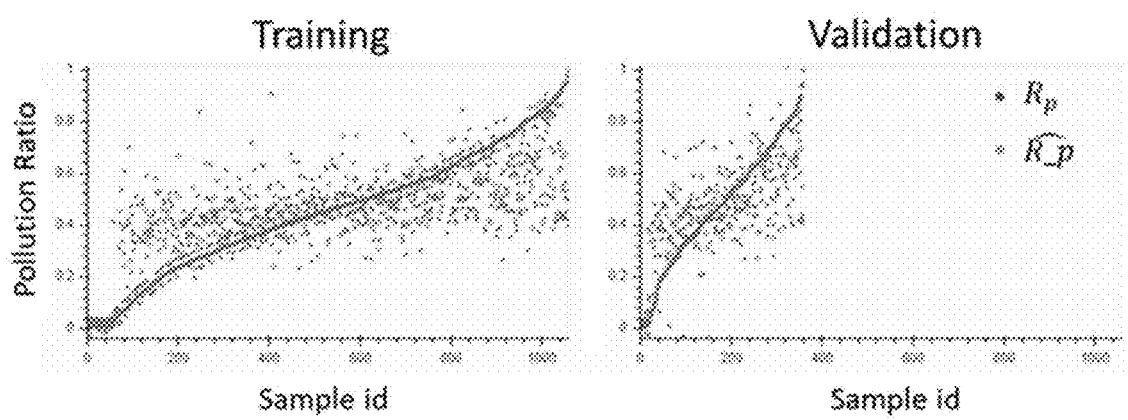
FIG. 12 is a set of graphs showing test results of the quality of predictions of a trained predictive pollution model.

FIG. 12 shows test results showing the quality of predictions of a trained predictive pollution model 750. The prefetch policy in use in this experiment is a policy in which the cache prefetches up to 8 pages of data for every request that is deemed part of a sequence. In short, the policy tries to determine if requests are sequential, by looking at precedent I/O requests. Such policy is referred to as SegDeltaLRU8, where the number 8 refers to the length of the maximum prefetch, in pages.

Notice that policies such as SegDeltaLRU8 try to detect patterns in sequences of requests, but they do not always succeed. By leveraging the predictor, it is possible to anticipate when a prefetch policy such as the SegDeltaLRU8 policy will fail. FIG. 12 depicts predictions of $R_p$ for the referred policy. The samples are sorted according to the true $R_p$, which appears as the line running through each graph, and the dots represent the predictions, $\widehat{R_p}$, from the trained predictive pollution model 750. In this example, the mean squared error of the predictions (MSE) was 0.03, the mean absolute error (MAE) was 0.13, and the $R^2$ was 0.48.

As shown in this experiment, it is possible to empirically demonstrate that the process described herein is effective in reducing the pollution of a caching policy that uses prefetching, with a small impact on the hit ratios. The main practical application of the method occurs when a cache system is either (a) diagnosed with response time problems due to prefetching or (b) is likely to suffer from performance degradation due to congested memory bus or small cache size. In those cases, it is possible to apply the method to reduce or prevent the increase of latency, by disabling prefetching when pollution is predicted and leaving the prefetch activated when the pollution is low.

Referring back to FIG. 8, once the predictive pollution model 750 has been trained to predict $R_p$ based on the sequentiality profile, it is possible to use the output of the trained predictive pollution model 750 to enable or disable prefetching (FIG. 8, block 720).

In some embodiments, using the trained predictive pollution model, the system predicts the $\widehat{R_p}$ at every time period t (e.g. each minute) for a given cache policy. If the $\widehat{R_p}$ is greater than a given threshold value, referred to herein as to as $R_{cut}$, prefetching is disabled (a determination of YES at block 800). Otherwise, prefetching is enabled (a determination of NO at block 800).

The particular value selected for $R_{cut}$ may depend on the particular storage system. There are several aspects involved in the tuning of $R_{cut}$. Experimentally, the value of $R_{cut}$ was varied to assess its impact on the metrics of interest. It was found that the allowed cache pollution grows as $R_{cut}$ increases. The dependency of hit ratios on $R_{cut}$, in contrast, is not straightforward. It was experimentally observed that as $R_{cut}$ increases, hit ratios also increase, although the increase in hit ratios is usually less significant than the growth in pollution. FIG. 14 shows an example of how the relative cache hits and cache pollution were found to change with selected values of $R_{cut}$.

In some embodiments, the particular value of $R_{cut}$ depends on (1) characteristics of the disk access pattern; (2) cache size; and (3) the maximum throughput supported by the memory bus.

If the disk access pattern is mostly non-sequential, there is little benefit in prefetching regardless of the cache size and memory bus throughput, and $R_{cut}$ should be set to a small value (to keep prefetching disabled most of the time). In contrast, if the cache size and memory bus throughput are very large, and the I/O access pattern is substantially sequential, $R_{cut}$ should be set to a large value (to enable more aggressive prefetching) over a larger number of sequentiality profiles.

In the situation where the cache size and/or memory bus throughput are limited, the value of $R_{cut}$ should be heuristically (self) determined and a more detailed analysis needs to be used to enable the particular storage system 100 to determine the appropriate value of $R_{cut}$ that will result in optimal results for that particular storage system.

In some embodiments, enabling the storage system 100 to heuristically determine the appropriate value for $R_{cut}$ may include several tests. In some embodiments, if there is unlimited memory bus throughput, the value of $R_{cut}$ is initialized as 0%, and then increased as the hit rate increases. As soon as the hit rate stops increasing, a candidate value for $R_{cut}$ has been determined.

In some embodiments, if there is unlimited cache size, the value of $R_{cut}$ is initialized as 0%, and then increased while memory bus throughput is not saturated, i.e., while system response times remain generally constant. As soon as response times increase, a candidate value for $R_{cut}$ has been determined.

In some embodiments, if there is both a limited cache size and limited memory bus throughput: $R_{cut}$ is initialized as 0%, and then increased while memory bus throughput is not saturated and hit ratios increase. Whenever one of those conditions is not met, a candidate value for $R_{cut}$ has been determined.

Figure 13:
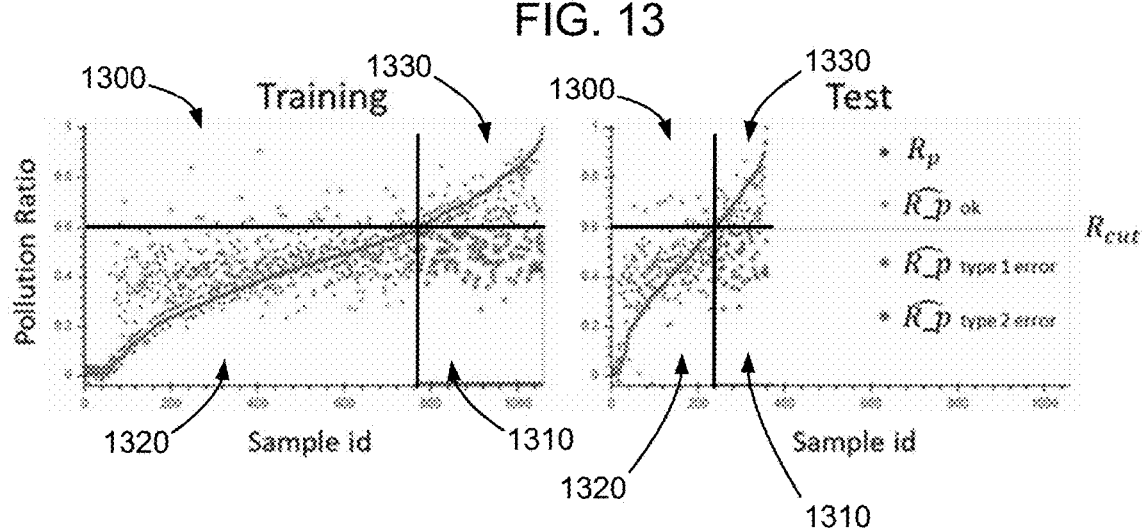
FIG. 13 is a set of graphs showing how selection of a threshold $R_{cut}$ for enabling/disabling a cache prefetch policy reduces the impact of prediction errors of the predictive pollution model.

FIG. 13 is a graph of predictive cache pollution and actual cache pollution values, and illustrates the manner in which selection of $R_{cut}$ determines whether prediction errors of the predictive pollution model 750 will affect cache performance. As discussed above, FIG. 12 shows the actual pollution (solid line) and predicted pollution (dots). As shown in FIG. 12, there are instances where the predictive pollution model 750 predicted more pollution than actually occurred (dots above the solid line) and other instances where the predictive pollution model 750 predicted less pollution than actually occurred (dots below the solid line).

However, by introducing the threshold $R_{cut}$ into the system, the number of errors by the predictive pollution model that affect operation of the cache management system are significantly decreased. To illustrate this, FIG. 13 has the value of $R_{cut}$ superimposed on the graph of FIG. 12. Specifically, in this example an assumed value of Rcut=0.6 has been shown. If the predictive pollution model 750 predicts a pollution level below Rcut and the actual pollution is below Rcut (quadrant 1320), prefetching will be enabled and the system will operate appropriately even if the amount of pollution that is predicted is dramatically different than the actual pollution. Likewise, if the predictive pollution model 750 predicts a pollution level above Rcut and the actual pollution model is above Rcut (quadrant 1330), prefetching will be disabled and the system will operate appropriately even if the amount of pollution that is predicted is dramatically different than the actual pollution. Thus, in both of these situations, the absolute accuracy of the predictive pollution model 750 is not operationally significant, since it does not incorrectly cause prefetching to be turned on/off on the cache 118.

The two situations where an improper pollution prediction by the predictive pollution model 750 will make a difference are where the predictive pollution model 750 predicts a pollution level above $R_{cut}$, and the actual pollution is below $R_{cut}$ (quadrant 1300) or where the predictive pollution model 750 predicts a pollution level below $R_{cut}$, and the actual pollution is above $R_{cut}$ (quadrant 1310). Specifically, these types of errors may affect performance of the cache, because the cache management system will incorrectly turn off prefetching where the predictive pollution model 750 predicts a pollution level above $R_{cut}$, when the actual pollution is below $R_{cut}$ (quadrant 1300). Conversely, the cache management will incorrectly turn on prefetching where the pollution model 750 predicts a pollution level below $R_{cut}$, when the actual pollution is above $R_{cut}$ (quadrant 1310). Accordingly, as shown in FIG. 13, the vast majority of prediction errors by the predictive pollution model 750 (quadrants 1320 and 1330) do not incorrectly result in turning on/off of the prefetch policy. Accordingly, by selecting $R_{cut}$ as discussed herein, the amount that inaccurate predictions affects the cache performance can be minimized. Specifically, this effectively reduces the error cases of the predictor, in the method, to a classification problem of the predicted pollution relative to the $R_{cut}$ value rather than the predicted pollution relative to the actual pollution value.

FIG. 9 shows an implementation designed to minimize the errors associated with selecting Rcut, by using a first Rcut value to turn OFF prefetching and a second Rcut value to turn ON prefetching.

For example, as shown in FIG. 9, two additional parameters x1 and x2 are given as scaling factors for the $R_{cut}$ value for the prefetching switch decision step (FIG. 7, block 715). In particular, if the predicted pollution ratio Rp is greater than x1*$R_{cut}$ (a determination of YES in block 900) the prefetch policy is disabled. If the predicted pollution ratio Rp is not greater than x1*$R_{cut}$ (a determination of NO in block 900), a second check is performed (block 910) to determine if the predicted pollution ratio Rp is less than or equal to x2*$R_{cut}$. If the predicted pollution ratio Rp is less than or equal to x2*$R_{cut}$ (a determination of YES at block 910) prefetching is enabled (block 920). Otherwise, if the predicted pollution ratio Rp is not less than or equal to x2*$R_{cut}$ (a determination of NO at block 910), the predicted value of Rp falls between x1*$R_{cut}$ and x2*$R_{cut}$, no change is made and the current prefetch policy is used (block 930).

Note that the configuration of the method shown in FIG. 8 corresponds an implementation of the method shown in FIG. 9 in the particular case where x1=x2.

Experiments were performed using these described methods using real-world workload trace data from a particular storage system. In particular, one goal was to illustrate the impact of $R_{cut}$ on the metrics of interest, and to illustrate that there is an elbow on the value of $R_{cut}$ such that if $R_{cut}$ is set to that value the hit rate is marginally affected whereas pollution significantly decreases. FIG. 14 shows relative cache hits and relative pollution with varying Rcut values.

The input data for the experiments was a data access trace workload corresponding to 1400 minutes of disk accesses from 6 different machines. In those machines, 760 requests were made per second, on average. As a result, the experimental dataset included roughly 45,600 requests per minute. For every minute of workload, a corresponding sequentiality profile was generated. Thus, there were a total of 1400 samples of sequentiality profiles. Those samples were randomly separated into two subsets: a subset with 1000 samples was used to create and train the prediction models, and the additional 400 test samples were used to generate the results shown in FIG. 14.

For the cache simulations of each system present in the workload, a cache size of 1% of the maximal address in the data access trace workload was considered, and it was assumed that each request occupied exactly one cache position. The prefetching policy employed was the SegDeltaLRU8 referenced above. Thus, the proposed method switched from SegDeltaLRU8 policy to Least Recently Used (LRU) cache eviction policy without prefetching, every time the predicted pollution was above $R_{cut}$, and switched back to SegDeltaLRU8 when the predicted pollution was below $R_{cut}$. Varying the $R_{cut}$ parameter, resulted in the values shown in the Table II:

TABLE II

| $R_{cut}$ Parameter | Total Hits | Total Pollution | Hits Relative | Pollution Relative |
| --- | --- | --- | --- | --- |
| 100% | 22458396 | 4495943 | 100% | 100% |
| 95% | 22084570 | 4265707 | 98% | 95% |
| 70% | 21644217 | 2440833 | 96% | 54% |
| 50% | 21011012 | 1335301 | 94% | 30% |
| 25% | 19589935 | 240701 | 87% | 5% |
| 15% | 19227422 | 78806 | 86% | 2% |
| 0% | 15256981 | 0 | 68% | 0% |

FIG. 14 is a bar graph showing the Hits Relative and Pollution Relative values of Table I in graphical form. Note that as the threshold $R_{cut}$ decreases, the pollution rate also decreases. In particular, the decrease in pollution is of up to 50% when the threshold decreases from 100% to 70%. The relative hit rate, in contrast, is roughly stable in that range, decreasing from 100% (maximum achievable) to 96% (decrease of 4% with respect to maximum).

It is apparent that the tradeoffs between hits and pollution yielded by varying values of $R_{cut}$ are significant. If the impact of pollution in a particular system is too significant, a relative pollution value of 30% might be too high. In this case, an optimal value of $R_{cut}$ may fall in the 25%-50% range. Thus, as described above, in some embodiments it is advantageous to determine the optimal $R_{cut}$ values with knowledge of the resource constraints in the actual domain. In any case, the experiments also demonstrated the benefits of using a method to predict pollution levels from sequentiality profiles and to make decisions about policy switching based on such predictions.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for optimizing performance of a storage system, comprising the steps of:
providing associated sequentiality profile and cache pollution information to a learning process to train the learning process to implement a predictive pollution model correlating sequentiality of workloads with cache pollution levels;
determining a sequentiality profile of a workload over a first time interval;
providing the sequentiality profile of the workload to the trained predictive pollution model;
obtaining a predictive cache pollution level for a second time interval from the trained predictive pollution model based on the provided sequentiality profile of the workload;
comparing the predictive cache pollution level with a threshold; and
adjusting a cache prefetching policy applied to a cache during the second time interval based on a result of the comparison of the predictive cache pollution level with the threshold.

2. The method of claim 1, wherein adjusting comprises turning ON a cache prefetching policy for the cache if the predictive cache pollution level is below the threshold, and turning OFF the cache prefetching policy for the cache if the predictive cache pollution level is above the threshold.

3. The method of claim 1, the threshold comprises first and second threshold values, and wherein adjusting comprises turning ON a cache prefetching policy for the cache if the predictive cache pollution level is below the first threshold value, turning OFF the cache prefetching policy for the cache if the predictive cache pollution level is above the second threshold value, and not making any adjustment to a current cache prefetch policy for the cache if the predictive cache pollution level is above the first threshold value and below the second threshold value.

4. The method of claim 1, wherein the storage system offers storage resources organized into logical storage volumes (LUNs), and wherein the step of determining the sequentiality profile of the current workload comprises determining individual sequentiality profiles for each LUN.

5. The method of claim 4, wherein the step of providing the sequentiality profile to the trained predictive pollution model comprises providing the individual sequentiality profile of each LUN to the trained predictive pollution model;
wherein the step of obtaining the predictive cache pollution level comprises obtaining a respective individual predictive cache pollution level of each LUN; and
wherein the step of comparing the predictive cache pollution level with a threshold comprises comparing the respective individual predictive cache pollution level with the threshold.

6. The method of claim 5, wherein the step of adjusting the cache prefetching policy applied to the cache comprises adjusting a respective cache prefetching policy applied to workloads associated with each LUN.

7. The method of claim 1, wherein the first time interval is a preceding time interval and the second time interval is a following succeeding time interval.

8. The method of claim 7, wherein a length of the first time interval and a length of the second time interval are the same.

9. The method of claim 1, wherein the learning process is based on a regression model.

10. The method of claim 9, wherein the regression model is a support vector regression learning process.

11. The method of claim 9, wherein the regression model is a regression tree learning process.

12. The method of claim 1, wherein sequentiality is determined from a histogram of numbers of address sequences of particular lengths in an ordered set of addresses referenced by workload traces on the cache over the first time interval.

13. The method of claim 1, wherein the threshold is heuristically determined for the storage system.

14. The method of claim 13, further comprising determining the threshold by:
initially setting the threshold to a very low value;
incrementally increasing the threshold while monitoring a hit rate on the cache; and
setting the threshold value to the value where the hit rate on the cache stops increasing.

15. The method of claim 13, further comprising determining the threshold by:
initially setting the threshold to a very low value;
incrementally increasing the threshold while monitoring a throughput on a memory bus by monitoring system response times; and
setting the threshold value to the value where the memory bus is saturated as indicated by an increase in system response time.

16. The method of claim 13, further comprising determining the threshold by:
initially setting the threshold to a very low value;
incrementally increasing the threshold while monitoring a hit rate on the cache and monitoring a throughput on a memory bus by monitoring system response times; and
setting the threshold value to the lower of (1) the value where the hit rate on the cache stops increasing or (2) the value where the memory bus is saturated as indicated by an increase in system response time.

* * * * *